United States Patent
Nordström et al.

(10) Patent No.: US 9,876,663 B2
(45) Date of Patent: Jan. 23, 2018

(54) METHOD AND APPARATUS FOR APPLICATION OF DISTORTION SHAPING WHEN USING PEAK-TO-AVERAGE RATIO REDUCTION

(71) Applicant: Telefonaktiebolaget LM Ericsson (publ), Stockholm (SE)

(72) Inventors: Eric Nordström, Stockholm (SE); Farshid Ghasemzadeh, Sollentuna (SE); Daniel Larsson, Uppsala (SE); Stefan Eriksson Löwenmark, Färentuna (SE); Mårten Sundberg, Årsta (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/915,565

(22) PCT Filed: Sep. 3, 2013

(86) PCT No.: PCT/SE2013/051029
§ 371 (c)(1),
(2) Date: Feb. 29, 2016

(87) PCT Pub. No.: WO2015/034404
PCT Pub. Date: Mar. 12, 2015

(65) Prior Publication Data
US 2016/0226693 A1    Aug. 4, 2016

(51) Int. Cl.
*H04L 27/26* (2006.01)
*H04L 25/03* (2006.01)
(Continued)

(52) U.S. Cl.
CPC ....... *H04L 27/2623* (2013.01); *H04B 1/0475* (2013.01); *H04L 25/03* (2013.01); *H04L 27/2624* (2013.01)

(58) Field of Classification Search
CPC ......... H04B 1/0475; H04B 1/10; H04L 25/03; H04L 25/03006; H04L 25/03254;
(Continued)

(56) References Cited

U.S. PATENT DOCUMENTS 6,657,964 B1 * 12/2003 Kohzuki ................. H04L 47/10
370/236.1
7,889,798 B2    2/2011 Piirainen et al.
(Continued)

FOREIGN PATENT DOCUMENTS

| CN | 1538650 A | 10/2004 |
| EP | 1 978 696 A2 | 10/2008 |
| WO | WO 2008/069488 A1 | 6/2008 |

OTHER PUBLICATIONS

Communication with Supplementary European Search Report, EP Application No. 13892960.9, dated Jul. 29, 2016.
(Continued)

*Primary Examiner* — Young T Tse
(74) *Attorney, Agent, or Firm* — Sage Patent Group

(57) ABSTRACT

Method and an apparatus for application of distortion shaping when using Peak-to-Average Ratio (PAR) reduction. The apparatus obtains an input signal. The apparatus applies, on the input signal, the PAR reduction and the distortion shaping to form an output signal. A bandwidth associated with the distortion shaping covers multiple channel bandwidths comprised in the input signal, which multiple channel bandwidths are associated with one or more Radio Access Technologies (RATs). Embodiments herein facilitate the distortion shaping and applicability of PAR reduction, in particular in case one of the RATs is Global System for Mobile Communications (GSM) or similar and/or the input signal is associated with radio communications systems that support multiple RATs.

20 Claims, 6 Drawing Sheets

(51) Int. Cl.
*H03B 1/04* (2006.01)
*H04B 1/04* (2006.01)

(58) Field of Classification Search
CPC ............. H04L 27/2614; H04L 27/2624; H04L 27/2626; H04L 27/2627; H04L 27/36; H04L 27/367; H04L 27/368; H04L 27/2623
USPC ....... 375/260, 285, 296, 297, 346, 348, 350; 381/94.1, 94.2, 94.3, 94.7, 94.8; 455/501, 455/63.1, 67.13, 114.2, 114.3
See application file for complete search history.

(56) References Cited

U.S. PATENT DOCUMENTS

| | | | |
|---|---|---|---|
| 8,320,497 B2* | 11/2012 | Behzad | .................. H04L 25/03 375/296 |
| 2002/0101936 A1 | 8/2002 | Wright et al. | |
| 2004/0203430 A1 | 10/2004 | Morris | |
| 2009/0092195 A1 | 4/2009 | Guo et al. | |
| 2009/0207936 A1 | 8/2009 | Behzad | |
| 2013/0114761 A1 | 5/2013 | Azadet et al. | |
| 2014/0269979 A1* | 9/2014 | Schafferer | ............. H03F 3/2175 375/295 |
| 2015/0004923 A1* | 1/2015 | Beaudin | ................... H04B 1/04 455/127.2 |

OTHER PUBLICATIONS

International Search Report, Application No. PCT/SE2013/051029, dated May 13, 2014.
Written Opinion of the International Searching Authority, Application No. PCT/SE2013/051029, dated May 13, 2014.
3GPP, Technical Specification—"3rd Generation Partnership Project; Technical Specification Group Radio Access Network; E-UTRA, UTRA and GSM/EDGE; Multi-Standard Radio (MSR) Base Station (BS) radio transmission and reception (Release 11)", 3GPP TS 37.104 V11.4.0 (Mar. 2013), 71 pp.
3GPP, Technical Specification—"3rd Generation Partnership Project; Technical Specification Group GSM/EDGE Radio Access Network; Radio transmission and reception (Release 11)", 3GPP TS 45.005 V11.3.0 (Mar. 2013), 255 pp.
Väänänen et al., "Reducing the Peak to Average Ratio of Multicarrier GSM and Edge Signals", *The 13th IEEE International Symposium on Personal, Indoor and Mobile Radio Communications* (vol. 1), Sep. 15-18, 2001, pp. 115-119.
Yang et al., "Crest Factor Reduction for Dual-Band Systems", *2013 IEEE MTT-S International Microwave Symposium Digest (IMS)*, Seattle, WA, Jun. 2-7, 2013, 3 pp.

* cited by examiner

METHOD AND APPARATUS FOR APPLICATION OF DISTORTION SHAPING WHEN USING PEAK-TO-AVERAGE RATIO REDUCTION

CROSS REFERENCE TO RELATED APPLICATION

This application is a 35 U.S.C. §371 national stage application of PCT International Application No. PCT/SE2013/051029, filed on Sep. 3, 2013, the disclosure and content of which is incorporated by reference herein in its entirety. The above-referenced PCT International Application was published in the English language as International Publication No. WO 2015/034404 A1 on Mar. 12, 2015.

TECHNICAL FIELD

Embodiments herein relate to a method and apparatus for application of distortion shaping when using Peak-to-Average Ratio (PAR) reduction.

BACKGROUND

Communication devices such as wireless devices may be also known as e.g. user equipments (UEs), mobile terminals, wireless terminals and/or mobile stations. A wireless device is enabled to communicate wirelessly in a cellular communications network, wireless communications system, or radio communications system, sometimes also referred to as a cellular radio system or cellular network. The communication may be performed e.g. between two wireless devices, between a wireless device and a regular telephone and/or between a wireless device and a server via a Radio Access Network (RAN) and possibly one or more core networks, comprised within the cellular communications network. The wireless device may further be referred to as a mobile telephone, cellular telephone, laptop, Personal Digital Assistant (PDA), tablet computer, just to mention some further examples. The wireless device may be, for example, portable, pocket-storable, hand-held, computer-comprised, or vehicle-mounted mobile device, enabled to communicate voice and/or data, via the RAN, with another entity, such as another wireless device or a server.

The cellular communications network covers a geographical area which is divided into cell areas, wherein each cell area is served by at least one base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. Cells may overlap so that several cells cover the same geographical area. By the base station serving a cell is meant that the radio coverage is provided such that one or more wireless devices located in the geographical area where the radio coverage is provided may be served by the base station. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile). In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

The expression downlink (DL) is used for the transmission path from the base station to the wireless device. The expression uplink (UL) is used for the transmission path in the opposite direction i.e. from the wireless device to the base station.

The so called Peak-to-Average Ratio (PAR) may be measured by, and also referred to, by the so called Peak-to-Average Power Ratio (PAPR) or Crest Factor (CF). PAPR and CF are calculated from the peak amplitude of a waveform divided by the Root Mean Square (RMS) value of the waveform. A too high PAR when transmitting a radio signal is undesirable e.g. since it sets strict and tough requirements on the power amplifier used when forming the radio signal and results in high power consumption. High PAR is considered a major drawback of multicarrier transmissions such as in the case of Radio Access Technologies (RATs) based on Orthogonal Frequency Division Multiplexing (OFDM) or Discrete Multitone Modulation (DMT) as e.g. is the case for LTE. However, technologies like UTRA and E-UTRA, as used in LTE, were specified with sufficient Error Vector Magnitude (EVM) margins to allow for PAR reduction since it was realized that it would be inefficient to dimension the radio hardware for the peak distributions with high PAR. In this regard UTRA and E-UTRA is quite similar, but GSM was not specified like this, so the same approach may not be taken.

The prior art regarding PAR reduction may be divided into two categories.

1) Methods that influence the PAR of the signal by adjusting various baseband properties. Known methods include e.g. affect coding, the constellation map, or apply reserved frequencies that is used to counter peaks.

2) Methods that know and care very little about the origin of the signal, which are methods such as clipping and filtering, peak windowing or FFT-based schemes. These methods are typically of greatest interest to use in practice since multiple digital signals, from e.g. different units, then may be fed into a single radio unit that performs the PAR reduction for all of the signals in combination. However, the PAR reduction distorts the signal and PAR reduction may therefore have the negative side effect of making it more difficult to fulfill signal quality and emission requirements at least in parts of the spectrum. Hence, most of the methods are combined with distortion shaping, that also may be named noise shaping, typically by filtering and/or windowing designed so that the resulting signal meet requirements such as regarding spectrum unwanted emissions. Distortion shaping alters the spectral shape of the distortion that is introduced by the PAR reduction. The distortion shaping may e.g. decrease distortion at frequencies where this is desirable, e.g. needed to meet requirements, to the expense of increased distortion at other frequencies but where this may be less of a problem. Methods according to category 2 are for example disclosed in:

US20040203430, which relates to peak power reduction using windowing and filtering. A circuit is disclosed that combined a scaling window peak reducing unit and a filter, which may effectively reduce the signal peaks without significantly increasing spurious emissions.

U.S. Pat. No. 7,889,798B2, which relates to a method of reducing the peak-to-mean ratio of a multi-carrier. A residual signal is generated from the multicarrier signal, the residual signal representing the difference between the multicarrier signal and a hard-clipped multicarrier signal. The method also includes the steps of applying a least squares function to the residual signal for each carrier of the multi-carrier signal, thereby generating a minimized residual signal for each carrier and combining the minimized residual signals and the multicarrier signal.

WO2008069488A1, which relates to reduction of PAPR in an OFDM system. A time-domain clipping reduces PAPR. A Fast Fourier Transform (FFT) is performed on the result and then a frequency-domain clipping reduces distortions generated by the time-domain clipping.

Vaananen, O.; Vankka, J.; Halonen, K., "Reducing the Peak to Average Ratio of Multicarrier GSM and Edge Signals", Electronic Circuit Design Laboratory, Helsinki Univ. of Technology, Espoo, Finland, Personal, Indoor and Mobile Radio Communications, 2002, The 13th IEEE International Symposium, Publication Date Sep. 15-18, 2002, vol. 1, pp. 115-119. In this paper it is disclosed an investigation regarding PAR reduction by clipping for two cases, GSM and EDGE.

SUMMARY

An object is to provide improvements with regard to application of distortion shaping when using Peak-to-Average Ratio (PAR) reduction.

According to a first aspect of embodiments herein, the object is achieved by a method in an apparatus for application of distortion shaping when using PAR reduction. The apparatus obtains an input signal. The apparatus then apply, on the input signal, the PAR reduction and the distortion shaping, whereby an output signal is formed. A bandwidth associated with the distortion shaping covers multiple channel bandwidths comprised in the input signal, which multiple channel bandwidths are associated with one or more RATs.

According to a second aspect of embodiments herein, the object is achieved by an apparatus for application of distortion shaping when using PAR reduction. The apparatus comprises an obtaining circuitry configured to obtain an input signal. The apparatus further comprises an applying circuitry configured to apply, on the input signal, the PAR reduction and the distortion shaping, whereby an output signal is formed. A bandwidth associated with the distortion shaping covers multiple channel bandwidths comprised in the input signal, which multiple channel bandwidths are associated with one or more RATs.

Owing to that the bandwidth associated with the distortion shaping covers multiple channel bandwidths, embodiments herein facilitate the distortion shaping and applicability of PAR reduction, in particular in case one of the RATs is GSM or similar and/or the input signal is associated with radio communications systems that support multiple RATs.

BRIEF DESCRIPTION OF THE DRAWINGS

Examples of embodiments herein are described in more detail with reference to the appended schematic drawings, in which.

DETAILED DESCRIPTION

Figure 1:
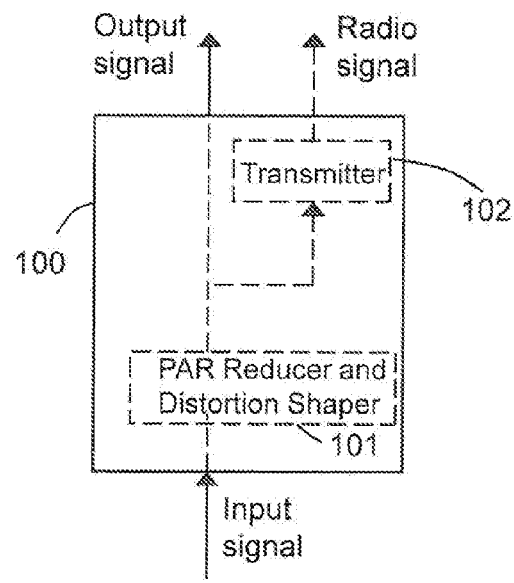
FIG. 1 is a schematic block diagram depicting an example of a radio unit comprising an apparatus in which embodiments herein may be implemented.

Before presenting embodiments herein and as part of the development towards embodiments herein, the situation and problem indicated in the Background will be further discussed.

As mentioned in the Background, in case of GSM there are not the same EVM margins to allow for PAR reduction as e.g. in case of LTE. Still, the composite GSM multicarrier BTS signal may have quite high PAR, similar to UTRA and E-UTRA signals. However, this is not a major concern when the declared number of carriers is low, but for larger configurations this may become an issue and it would be beneficial if PAR reduction could be used.

Multicarrier Base Transceiver Station (MCBTS) is defined in release 8 (Rel-8) in 3GPP GSM/EDGE Radio Access Network (GERAN) specifications. Since 2008 this base station class has been improved with various corrections, test cases, non-contiguous deployment and more recently new classes for nodes with lower output power. Basically a MCBTS transmitter is similar to a normal BTS. However, one difference is less stringent requirements on transmitter intermodulation attenuation and spurious emissions to be able to make it feasible to realize the specification on an Multi-Standard Radio (MSR) BS architecture.

Requirements on spectrum unwanted emissions is e.g. defined in 3GPP TS 45.005, version 11.0.0, Section 4.2 "Output RF spectrum" and 3GPP TS 37.104, version 11.0.0, Section 6.6 "Unwanted emissions".

When GSM/GERAN is used in mixed-RAT mode with UTRA and/or E-UTRA, the transmitted signal comprises a mix of the involved RATs. Hence, some PAR reduction may be desirable or even needed to be used and be active, at least due to the signal characteristics of UTRA and E-UTRA.

It is desirable to base new BTS equipment on the MCBTS specification and architecture in order to support more than one RAT and therefore also desirable to align requirements across RATs. Any RAT that has a particularly strict requirement may thus be dimensioning regarding e.g. hardware for the other supported RATs. This may be problem in case of PAR reduction is desirable or even needed and when one of the involved RATs is GSM.

Hence, it is desirable with solutions facilitating or enabling use of PAR reduction in case of GSM/GERAN and/or when GSM/GERAN is used in mixed-RAT mode with e.g. UTRA and/or E-UTRA.

In general it is desirable to provide equipment, such as BTS equipment, that support PAR reduction and distortion shaping but that do not need to take special considerations towards what technology is being operated.

The prior art methods for distortion shaping when using PAR reduction, as discussed in the Background, uses a bandwidth for the distortion shaping that corresponds to a channel bandwidth of a RAT associated with the signal subject to the PAR reduction. This association may be considered natural since requirements regarding emissions and signal quality typically are defined differently within and outside the channel bandwidth. Application of PAR reduction and distortion shaping according to the prior art methods would probably work, at least to a certain degree, for RATs as LTE and WCDMA. The performance would depend on carrier bandwidths of the carrier mix, but for most configurations it would still be worthwhile to apply PAR reduction as in the prior art. However, as already mentioned, GSM is different. The transmission bandwidth of a GSM carrier is around 270 kHz wide, while a (single) WCMDA carrier is around 4 MHz and an LTE carrier can be up to 18 MHz wide. To understand why this may matter, it may be noted that a signal peak, as defined as being the signal exceeding a threshold, is not at all constrained within the bandwidth(s) of the carrier(s) that is/are being transmitted. Extracting the peak value is a non-linear operation, so the spectrum contents of the peak signal would be spread out compared to the original signal. This is known as spectral widening. When looking at a narrowband system like GSM with multiple carriers being transmitted, large parts of the power of the signal peak will often have spectral components that do not coincide with the narrow GSM carriers being transmitted. This effect is dependent on the individual carrier frequencies of the mix, but since GSM usually is configured for frequency hopping, it is fairly common situation that the spectrum of the peak do not match spectrum of the transmitted signals very well. The prior art methods target the signal peak, so this should be a common issue regardless the prior art specific method. The peak signal spectrum vs. carrier spectrum mismatch is a problem associated with GSM since emission requirements do not allow emissions outside the transmitted carriers. RATs with wider carriers have a better match between the spectrum of the signal peaks and the spectrum of the transmitted carriers, as long as carrier separations do not become large since the situation then would become similar to the GSM situation. This is partially due to that peaks that are short in the time domain are wide in the frequency domain, but also that individual carrier frequencies of the mix affects the frequency characteristics of the peaks. The prior art methods are usually non-linear in nature, so intermodulation frequencies are a good indication on where one may expect to find frequency components of the peaks.

Embodiments herein, as will be further described next, may be considered to origin from the idea of seeing GSM as a wideband system, e.g. as is the case for LTE, for application of distortion shaping when using PAR reduction. With this view, each GSM carrier may be considered to correspond to a sub-carrier in LTE. That is, in case of GSM this would result in that the bandwidth associated with the distortion shaping when using PAR reduction would cover multiple GSM carriers and transmission bandwidth and thus comprise multiple GSM channel bandwidths. The distortion shaping will thereby e.g. have more available bandwidth to operate on which enable improved performance since the distortion may be more smeared out.

By channel bandwidth is referred to a bandwidth supporting a single Radio Frequency (RF) carrier with a transmission bandwidth. The channel bandwidth is typically measured in MHz and is typically used as a reference for transmitter and receiver RF requirements. The RF carrier and its associated transmission bandwidth are comprised within the channel bandwidth. The RF carrier, transmission bandwidth and channel bandwidth may be as defined for E-UTRA, UTRA or GSM/EDGE. The transmission bandwidth is configured in the uplink or downlink of a cell.

FIG. 1 is a schematic block diagram depicting an example of an apparatus 100 in which embodiments herein may be implemented and in relation to which embodiments herein will be exemplified and explained. The apparatus 100 may comprise a PAR reducer and distortion shaper 101 and may comprise a radio transmitter 102. The apparatus 100 is configured to receive an input signal that typically and advantageously is an input digital signal. Processing of the input signal by the apparatus 100 will also be described separately below, but in short the apparatus 100, e.g. by means of the PAR reducer and distortion shaper 101, is configured to perform PAR reduction and distortion shaping on the input signal and form an output signal of the result, which output signal also typically and advantageously is digital. The output signal may be output from the apparatus 100 or be fed to the radio transmitter 102 that may be configured to form a radio signal based on the output signal. The radio signal is typically transmitted, or is provided for transmission, by an antenna (not shown). Actions relating to the apparatus 100 and embodiments herein will be further described below.

Figure 2:
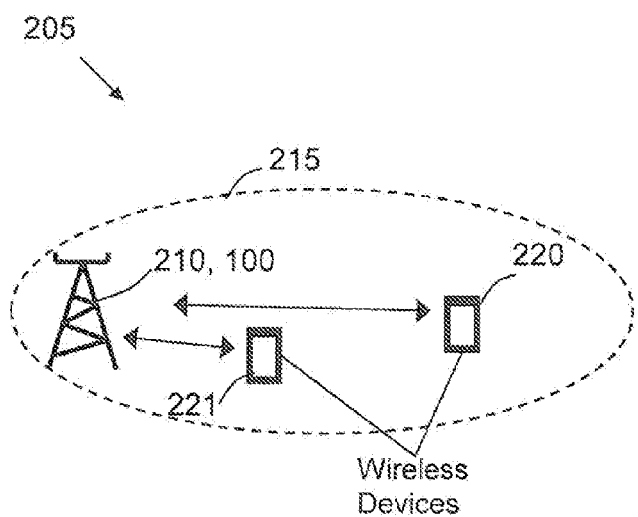
FIG. 2 is a schematic block diagram depicting an example of a radio communications system, in relation to which embodiments herein will be explained.

FIG. 2 is a schematic block diagram depicting an example of a radio communications system 205, in relation to which embodiments herein will be explained. The radio communications system 205 may be as described above and supports one or more RATs. The radio communications system 205 comprises a base station 210 serving a cell 215. Just to illustrate that the radio communications system 205 may be of the kind described above, two wireless devices 220, 221 are shown served by the base station 210 in the cell 215 and exemplify one or more wireless devices that may be served by the base station 210. The apparatus 100 is comprised in the base station 210 and may be in the form of a radio unit configured to provide the radio signal. The input signal to the apparatus 100 in this case typically comprises downlink traffic, such as voice and/or data traffic, for reception by wireless devices, such as wireless devices 220, 221, served in the cell 215. The downlink traffic may originate from e.g. one or more of the wireless devices 220, 221, other wireless devices, such as served in other cells (not shown) and/or served in other radio communications systems, from the internet, etc. The radio communications system 205 typically comprises one or more core networks (not shown) and the downlink traffic may fully or partly be received via one or more of the core networks. The apparatus 100 may by means of the radio transmitter 102 be configured to form the radio signal based on the output signal from the PAR reducer and distortion shaper 101 and then output the formed radio signal for downlink transmission by an antenna (not shown) of the base station 210.

Attention is again drawn to that FIG. 2 is only schematic and for exemplifying purpose. The radio communications system 205 may, and typically will, in reality comprise several further cells, base stations, wireless devices, network nodes etc., as realized by the skilled person, but which are not shown herein for simplicity.

Figure 3:
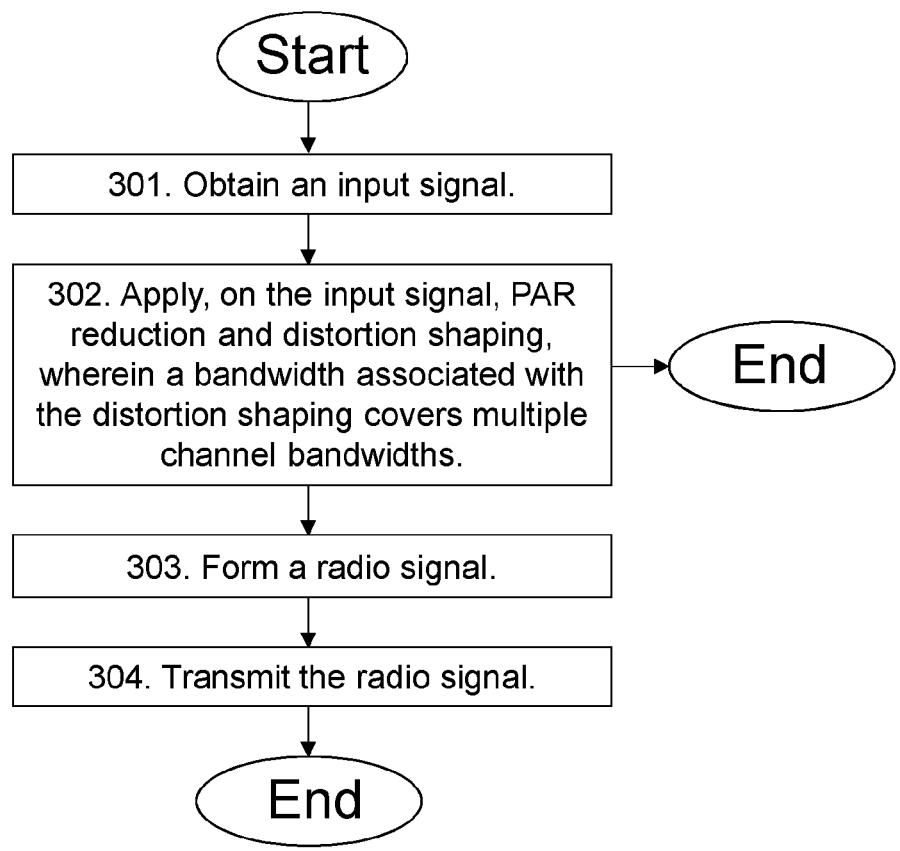
FIG. 3 is a flow chart illustrating a method in a an apparatus for application of distortion shaping when using PAR reduction, according to embodiments herein.

Embodiments herein relating to a method in an apparatus, e.g. the apparatus 100, for application of distortion shaping when using PAR reduction, will now be further elaborated and described with reference to the flowchart depicted in FIG. 3. As discussed above, distortion shaping when using PAR reduction shapes distortion introduced by the PAR reduction. The apparatus 100 may be comprised in a base station, e.g. base station 210, of a radio communications system, e.g. radio communications system 205, in which the output signal is to be transmitted as a radio signal by the base station 210. The method comprises the following actions, which actions may be taken in any suitable order. Further, actions may be combined.

Action 301

The apparatus 100 obtains an input signal. For example the apparatus 100 may obtain the input signal as discussed above in connection with FIGS. 1-2, i.e. the input signal may e.g. comprise downlink traffic to be transmitted by the base station 210 to one or more wireless devices, e.g. the wireless devices 220, 221.

Action 302

The apparatus 100 applies the PAR reduction and the distortion shaping on the input signal that was obtained, whereby an output signal is formed, such as the output signal as discussed above in connection with FIGS. 1-2. That is, the output signal may subsequently be transmitted as a radio signal by the base station 210 for reception by the wireless devices 220, 221. As mentioned above, PAR reduction results in less strict requirements on e.g. a power amplifier used when forming the radio signal compared to if the radio signal would be formed from the input signal, and it also results in lower power consumption. Hence the PAR reduction may e.g. result in less strict requirements and lower power consumption for the radio transmitter 102. As also mentioned above, the distortion shaping is for reducing negative impact by the PAR reduction regarding emission and signal quality.

A bandwidth associated with the distortion shaping covers multiple channel bandwidths comprised in the input signal, wherein the multiple channel bandwidths are associated with one or more RATs. This facilitate the distortion shaping and applicability of PAR reduction, in particular in case one of the RATs is GSM or similar and/or the input signal is associated with radio communications systems that support multiple RATs. The PAR reduction, distortion shaping and how it may relate to prior art methods will be further explained separately below. Moreover, the bandwidth associated with the distortion shaping and the relation to the multiple channel bandwidths according to embodiments herein will be further discussed and exemplified below in connection with FIG. 4.

In some embodiments, the distortion shaping is based on filtering and/or windowing and the bandwidth associated with the distortion shaping is a filtering and/or windowing bandwidth. As realized by the skilled person, filter or filters used for the filtering are associated, e.g. designed, with a band pass region in the frequency domain. By filtering bandwidth is meant this region. Also, as realized by the skilled person, windowing that takes part in the time domain corresponds to filtering in the frequency domain and is likewise associated with a band pass region. By windowing bandwidth is meant this region.

In some embodiments the bandwidth associated with the distortion shaping covers channel bandwidths associated with different RATs.

In some embodiments, the bandwidth associated with the distortion shaping covers channel bandwidths associated with a RAT that is based on multiple spaced-apart carrier centred transmission bandwidths. For example, the bandwidth associated with the distortion shaping may cover channel bandwidths associated with GSM.

When the apparatus 100 is comprised in the base station 210 of the radio communications system 205, the bandwidth associated with the distortion shaping may advantageously comprise, or correspond to, a contiguous frequency block allocated to an operator of the radio communications system 205. The contiguous frequency block may e.g. be used for GSM or for GSM in combination with UTRA or E-UTRA. In case of a single RAT as e.g. GSM, the frequency block may be such assigned to a frequency layer planned by the operator.

Action 303

This action is optional for embodiments herein. The apparatus 100 forms, e.g. by means the radio transmitter 102 as described above, a radio signal based on the output signal. Forming the radio signal typically comprises radio mixing and power amplification of the output signal.

Action 304

This action is optional for embodiments herein. The apparatus 100 transmits the radio signal, e.g. by means the radio transmitter 102 as mentioned above. When the apparatus is comprised in the base station 210, the radio signal is typically transmitted via an antenna (not shown) of the base station 210, i.e. in the downlink, to e.g. the wireless devices 210, 211

Figure 4:
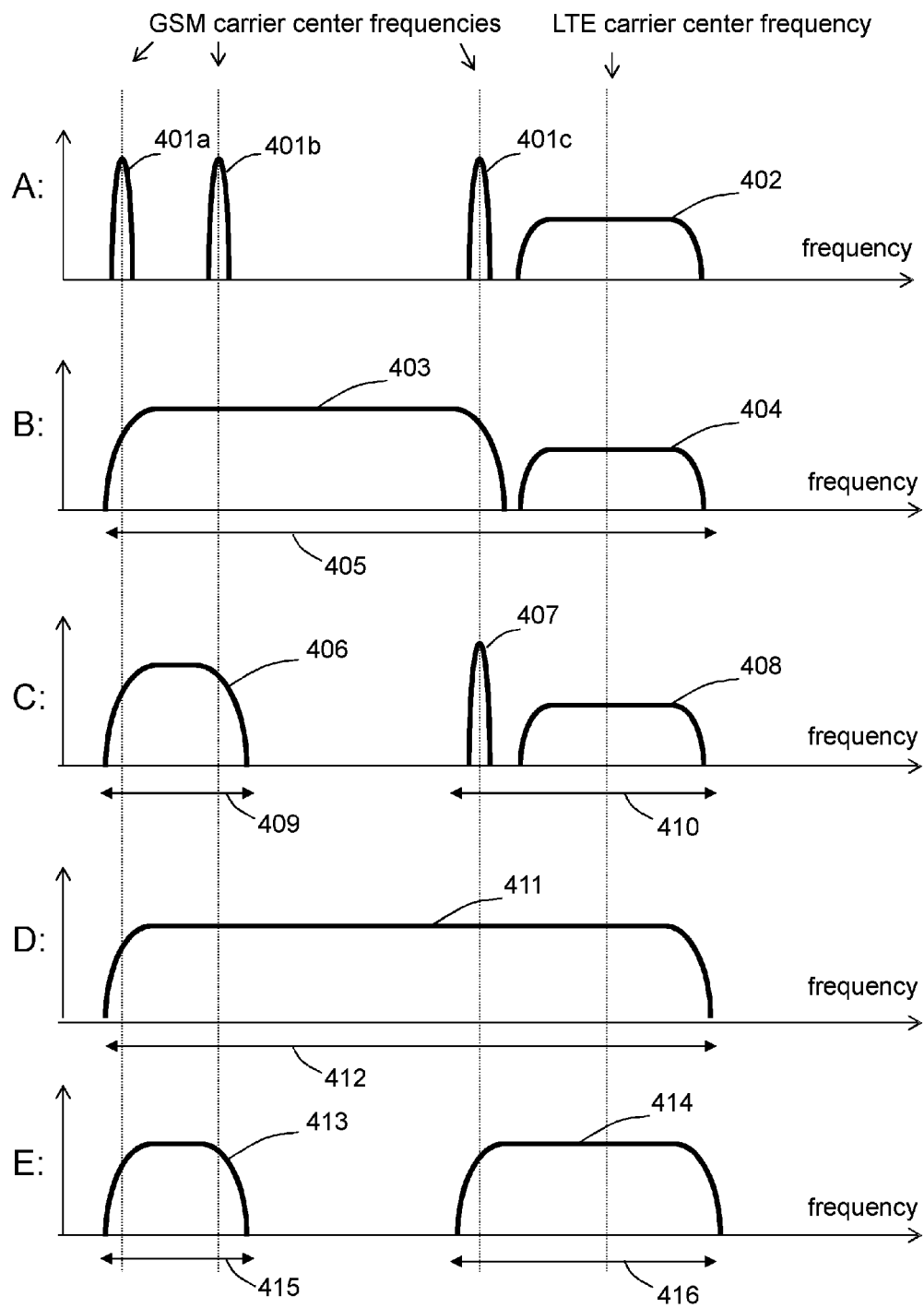
FIG. 4 schematically illustrates five different frequency spectrum views A-E for illustrating the bandwidth associated with the distortion shaping according to embodiments herein.

FIG. 4 schematically illustrates five different frequency spectrum views A-E for illustrating the bandwidth associated with the distortion shaping according to embodiments herein. The frequency spectrum views show frequency contents that are described below and they are presented in a manner so as to facilitate comparison with each other.

View A shows first frequency contents 401a-c that exemplify GSM transmissions with transmission bandwidths centered around GSM carriers, where each transmission bandwidth is within a respective GSM channel bandwidth. Similarly, a second frequency content 402 exemplifies LTE transmission with transmission bandwidth within a LTE channel bandwidth. As illustrated and already mentioned above, in GSM the transmission and channel bandwidths are narrowband, typically in the magnitude of hundreds of kHz and spaced apart, while in LTE, the transmission and channel bandwidths are more wide band, typically in the magnitude of tenths of MHz. As also mentioned above, in the prior art methods and implementations thereof, the respective bandwidth associated with the distortion shaping covers only one RAT and one channel bandwidth. Hence, the frequency content in view A may be considered to also illustrate bandwidths associated with the distortion shaping according to the prior art. For example, according to the prior art there would be a respective bandwidth associated with distortion shaping used for each one of the three shown GSM carriers, which would correspond to respective one of the shown frequency contents 401a-c.

Views B-E, for comparison with view A, respectively shows frequency content that schematically illustrates how bandwidths associated with the distortion shaping may look like according to embodiments herein.

View B shows a third frequency content 403 that corresponds to the bandwidth associated with distortion shaping according to embodiments herein. The bandwidth covers the first frequency contents 401a-c, i.e. covering the GSM transmissions with transmission bandwidths centered around GSM carriers and corresponding channel bandwidths. In other words, the bandwidth corresponding to the third frequency content 403 exemplifies the situation described above under Action 302 when the bandwidth associated with the distortion shaping covers multiple channel bandwidths comprised in the input signal, and where the multiple channel bandwidths are associated with one RAT, here GSM.

View B also shows a first contiguous frequency block 405 allocated to an operator of the radio communications system, e.g. the radio communications system 205, as mentioned above under Action 302. Hence, the bandwidth corresponding to the third frequency content 403 also exemplifies the situation described above under Action 302 where the bandwidth comprises a contiguous frequency block allocated to an operator of the radio communications system 205.

Note that view B also shows a fourth frequency content 404 that may be associated with distortion shaping but that only cover the second frequency content 402, i.e. covering the LTE transmission with transmission bandwidth within a single LTE channel bandwidth, and is thus not according to embodiments herein.

View C shows a fifth frequency content 406 that corresponds to the bandwidth associated with distortion shaping according to embodiments herein. The bandwidth covers the parts 401a-b of the first frequency contents 401a-c. That is, the bandwidth corresponding to the fifth frequency content 406 also exemplifies the situation described above under Action 302 where the bandwidth associated with the distortion shaping covers multiple channel bandwidths comprised in the input signal, and when the multiple channel bandwidths are associated with one RAT, here GSM.

View C also shows a second contiguous frequency block 409 allocated to an operator of the radio communications system, e.g. the radio communications system 205, as mentioned above under Action 302. Hence, the bandwidth corresponding to the fifth frequency content 406 also exemplifies the situation described above under Action 302 where the bandwidth corresponds to a contiguous frequency block allocated to an operator of the radio communications system 205.

Note that view C also shows a sixth frequency content 407 and seventh frequency content 408 that respectively may be associated with distortion shaping but that respectively only cover the remaining single part 401c of the first frequency content 401a-c and the second frequency content 402, i.e. respectively covering only a single GSM transmission bandwidth within a single GSM channel bandwidth and a LTE transmission with transmission bandwidth within a single LTE channel bandwidth, and are thus not according to embodiments herein. Both the sixth frequency content 407 and seventh frequency content 408 may be within a third contiguous frequency block 410 allocated to an operator of the radio communications system, but may still have been chosen not to be covered by a common bandwidth associated with distortion shaping since they belong to different RATs.

View D shows an eighth frequency content 411 that corresponds to the bandwidth associated with distortion shaping according to embodiments herein. The bandwidth covers the first frequency contents 401a-c and the second frequency content. That is, the bandwidth corresponding to the eighth frequency content 411 also exemplifies the situation described above under Action 302 where the bandwidth associated with the distortion shaping covers multiple channel bandwidths comprised in the input signal, but in this example when the multiple channel bandwidths are associated with multiple and different RATs, here GSM and LTE.

View D also shows a fourth contiguous frequency block 412 allocated to an operator of the radio communications system, e.g. the radio communications system 205, as mentioned above under Action 302. Hence, the bandwidth corresponding to the eighth frequency content 411 also exemplify the situation described above under Action 302 when the bandwidth corresponds to a contiguous frequency block allocated to an operator of the radio communications system 205.

View E shows an ninth frequency content 413 and tenth frequency content 414, where each corresponds to the bandwidth associated with distortion shaping according to embodiments herein. The bandwidth associated with the ninth frequency content 413 covers the parts 401a-b of the first frequency contents 401a-c. The bandwidth associated with the tenth frequency content 414 covers the part 401c of the first frequency contents 401a-c and the second frequency content 402. That is, each of the bandwidths corresponding to the respective ninth and tenth frequency contents 413, 414 also exemplifies the situation described above under Action 302 where the bandwidth associated with the distortion shaping covers multiple channel bandwidths comprised in the input signal. In the case of the ninth frequency content 413 it is illustrated when the multiple channel bandwidths are associated with one RAT, here GSM, and in the case of the tenth frequency content 414 it is illustrated when the multiple channel bandwidths are associated with multiple and different RATs, here GSM and LTE.

View E also shows a fifth contiguous frequency block 415 allocated to an operator of the radio communications system, e.g. the radio communications system 205, as mentioned above under Action 302. Hence, the bandwidth corresponding to the ninth frequency content 413 also exemplify the situation described above under Action 302 where the bandwidth corresponds to a contiguous frequency block allocated to an operator of the radio communications system 205. Additionally view E shows a sixth contiguous frequency block 416 allocated to an operator of the radio communications system, e.g. the radio communications system 205, as mentioned above under Action 302. Hence, the bandwidth corresponding to ninth frequency content 413 as well exemplifies the situation described above under Action 302 where the bandwidth corresponds to a contiguous frequency block allocated to an operator of the radio communications system. Reason that the frequency contents of view E does not look like those of view D may be that there is no contiguous frequency block allocated to the operator and that covers all frequency contents 401a-c, 402.

Figure 5:
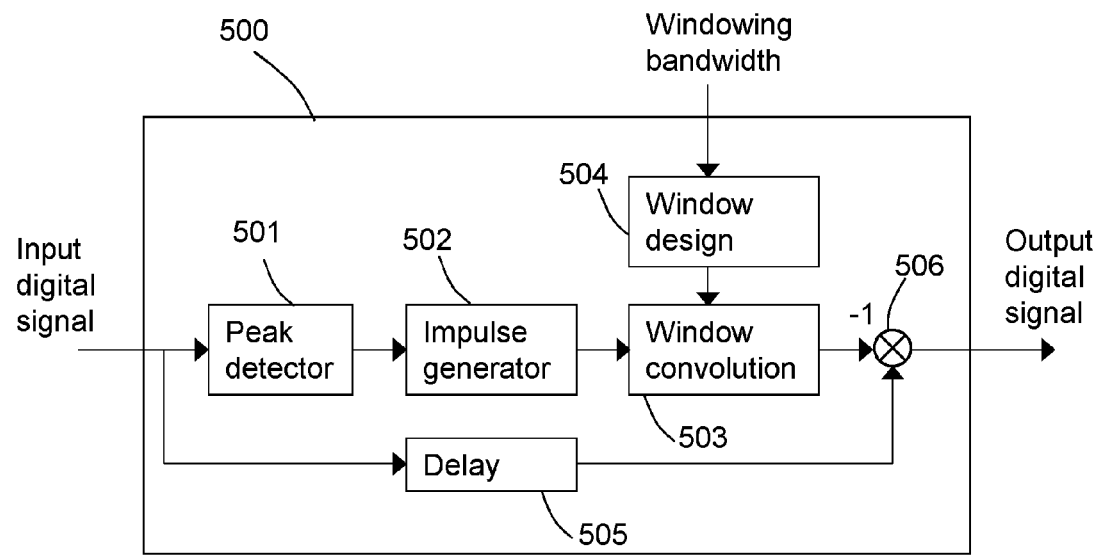
FIG. 5 is a schematic block diagram showing an general architecture of an apparatus in which embodiments herein based on windowing may be implemented.

FIG. 5 is a schematic block diagram showing an example of a general architecture of an apparatus 500 in which embodiments herein based on windowing may be implemented. The apparatus comprises a peak detector 501, an impulse generator 502, a window convolution block 503, a window design block 504, a delay block 505 and a multiplier 506. The apparatus 500 is configured to obtain an input digital signal, e.g. as discussed above, and a windowing bandwidth and based on these provide an output digital signal. The peak detector 501 is configured to operate on the input digital signal and thereby provide a first intermediate signal. The impulse generator 502 is configured to operate on the first intermediate signal and thereby provide a second intermediate signal. The window design block 504 is configured to operate on the windowing bandwidth and based on this provide a window design. The window convolution block 503 is configured to, based on the window design, operate on the second intermediate signal and thereby provide a third intermediate signal. The delay block 505 is configured to operate on the input digital signal and thereby provide a fourth intermediate signal. The multiplier 506 is configured to operate on the third and fourth intermediate signals and thereby provide the output digital signal.

The apparatus 500 may fully or partly correspond to or be comprised in the apparatus 100, e.g. may the apparatus 500 fully or partly correspond to the PAR reducer and distortion shaper 101 that may be comprised in the apparatus 100.

Figure 6:
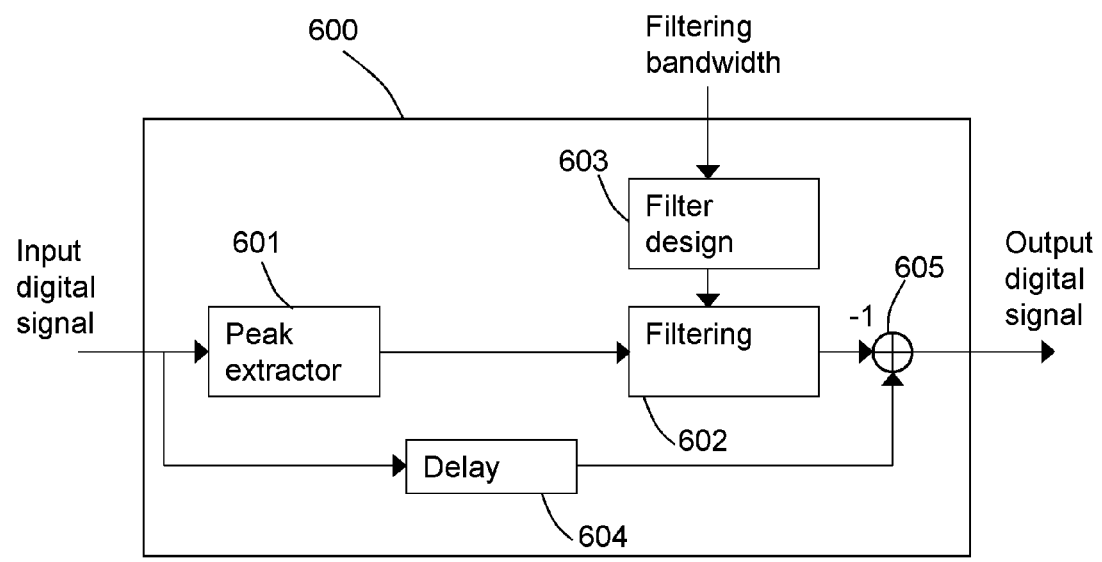
FIG. 6 is a schematic block diagram showing an general architecture of an apparatus in which embodiments herein based on filtering may be implemented.

FIG. 6 is a schematic block diagram showing an example of a general architecture of an apparatus 600 in which embodiments herein based on filtering may be implemented. The apparatus comprises a peak extractor 601, a filtering block 602, a filter design block 603, a delay block 604 and an adder 605. The apparatus 600 is configured to obtain an input digital signal, e.g. as discussed above, and a filtering bandwidth and based on these provide an output digital signal. The peak extractor 601 is configured to operate on the input digital signal and thereby provide a first intermediate signal. The filter design block 603 is configured to operate on the filtering bandwidth and based on this provide a filter design. The filtering block 602 is configured to, based on the filter design, operate on the first intermediate signal and thereby provide a second intermediate signal. The delay block 604 is configured to operate on the input digital signal and thereby provide a third intermediate signal. The adder 605 is configured to operate on the second and third intermediate signals and thereby provide the output digital signal digital.

The apparatus 600 may fully or partly correspond to or be comprised in the apparatus 100, e.g. may the apparatus 600 fully or partly correspond to the PAR reducer and distortion shaper 101 that may be comprised in the apparatus 100.

Since the distortion shaping when using PAR reduction in prior art targets a single RAT at time and one channel bandwidth within this RAT, the channel bandwidth, the bandwidth associated with the distortion shaping is typically predetermined and implementations use pre-designed filters or windows. When implementing embodiments herein, instead of using pre-designed filters or windows, an external information source may be used in adaptation of prior art filters and/or windows. The external information source may provide information so that the bandwidth associated with the distortion shaping according to embodiments herein, i.e. that covers multiple channel bandwidths, is used. This bandwidth is typically provided to be a spectrum part that need not be protected to the same extent as other parts, e.g. being associated with less stringent requirements regarding distorting emissions. This is typically the case for a contiguous frequency block that is allocated to and is used by one and the same operator. For example, when implementing embodiments herein, information may be obtained from the information source, which information informs about the contiguous frequency block that is allocated to and is used by one and the same operator and that then is used as the bandwidth associated with the distortion shaping according to embodiment herein. The information obtained from the information source may fully or partly correspond to the windowing bandwidth or filtering bandwidth discussed in connection with FIGS. 6-7.

By using the contiguous frequency block allocated to the operator, any negative side effects from the more wide band distortion shaping compared to the prior art implementations, are enabled to only or mainly affect the operator that is able to control whether to apply embodiments herein or not, where, how and/or to what extent. This means that requirements need not be as stringent as in the cases targeted by the prior art implementations. Additionally, in case the operator has been allocated a contiguous frequency block and uses it for MSR as mentioned above, the requirements on transmitter intermodulation attenuation and spurious emissions are less stringent than for "one standard radio". For example, in case of MSR comprising GSM and say LTE, an implementation of embodiments herein may result in violation of present spectrum emission requirements for GSM "alone", without MSR, but would in any case only be within the operator's own spectrum. Also, it has been seen in simulations that this nevertheless does not significantly degrade network performance.

As mentioned, existing implementations of prior art methods, e.g. algorithms, for PAR reduction and distortion shaping regarding distortion resulting from the PAR reduction may be adapted so that the bandwidth associated with the distortion shaping covers multiple channel bandwidths according to embodiments herein. It should be realized that embodiments herein thus may be implemented on many existing equipment by comparatively simple adaptation, e.g. by reconfiguration, that may involve only software, although the adaptation in general may involve hardware and/or software.

For example, in U.S. Pat. No. 7,889,798B2 mentioned in the Background, there are filters 106a-d that may be replaced by a wideband filter with a filtering bandwidth according to embodiments herein, e.g. corresponding to a contiguous frequency block allocated to an operator.

Also, for example, in US20040203430 mentioned in the Background, there is a window memory 545 that may be adapted to implement a window or windows having a windowing bandwidth according to embodiments herein, e.g. corresponding to a to a contiguous frequency block allocated to an operator.

Additionally, for example, in WO2008069488A1 mentioned in the Background, there is a step S103 that may be adapted to operate on a bandwidth associated with distortion shaping according to embodiments herein.

Note that in general, window/s and/or filter/s that may be used for implementation of embodiments herein may be window/s and/or filter/s according to prior art methods and/or implementations thereof, that has been adapted, e.g. redesigned, to use filtering and/or windowing bandwidth(s) according to embodiments herein. The window(s) and/or filter(s) to use for implementing embodiment herein may be pre-designed and retrieved via or in response to obtained information from e.g. said external information source, or designed online, which also may be in response to obtained information e.g. from said external information source. The obtained information may comprise a value or values specifying the filtering and/or windowing bandwidth. It is of course also possible with implementations of embodiments herein where the filtering and/or windowing bandwidth(s) are pre-defined and fix for the implementation.

Figure 7:
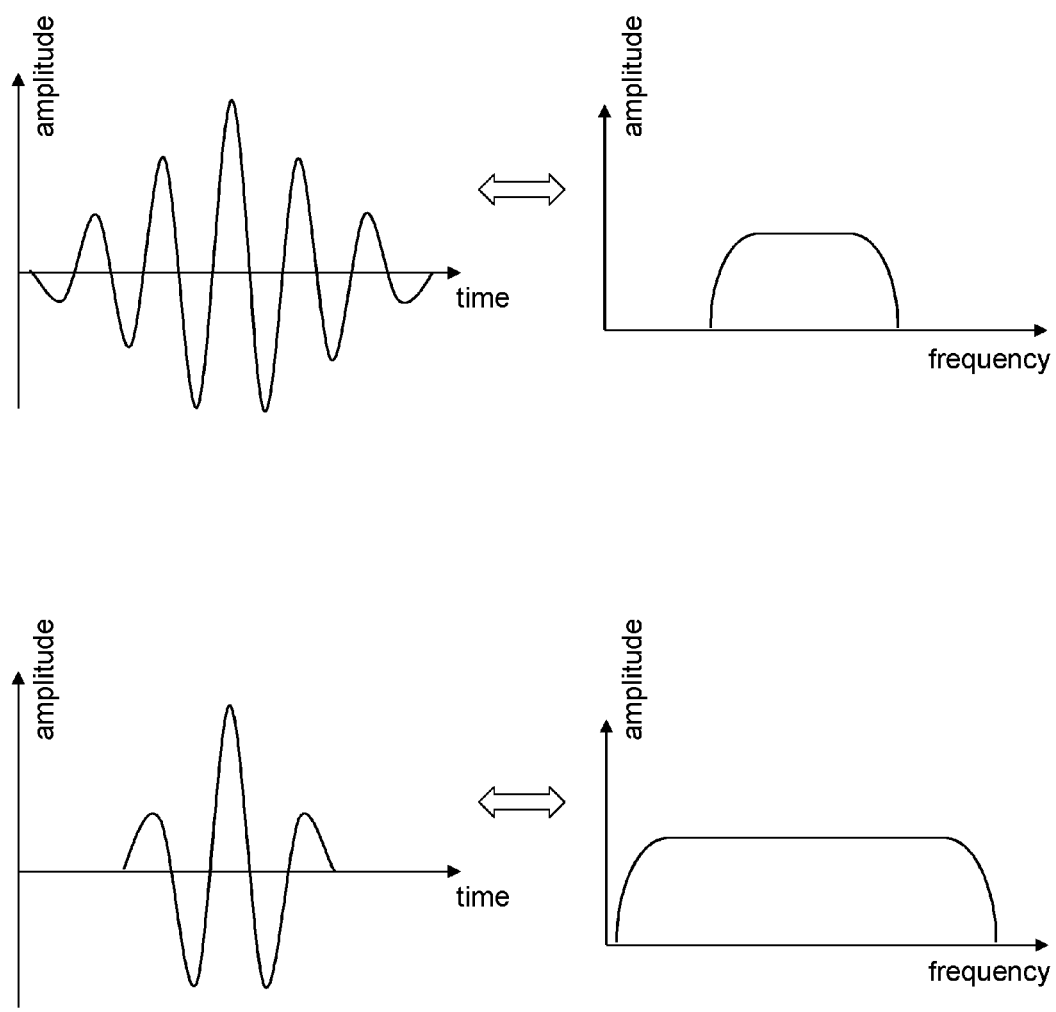
FIG. 7 exemplifies the basic inverse relation between window length and occupied bandwidth in case of windowing.

FIG. 7 schematically exemplifies, for reference, a basic inverse relation between window length and occupied bandwidth in case of windowing. The upper time and frequency domain diagrams belong together, and the lower time and frequency domain diagrams belong together. Note that the upper window in the time domain is of longer length than the lower window. However, the frequencies associated with the upper window occupies more bandwidth than the frequencies associated with the lower window. For example, the bandwidth associated with distortion shaping according to embodiments herein may correspond to a bandwidth with less stringent distortion requirement. Say e.g. that as the bandwidth according to embodiments herein is selected a certain bandwidth within which emissions relating to signal distortion is associated with certain, typically, less stringent, requirements for some reason. An algorithm that implements PAR reduction and windowing for the distortion shaping, e.g. according to the architecture shown in FIG. 5, may then be adapted to use a suitable window, typically shortest possible, to fill this bandwidth. A window as short as possible without exceeding the windowing bandwidth will more accurately match short peaks, thus causing less degradation.

Figure 8:
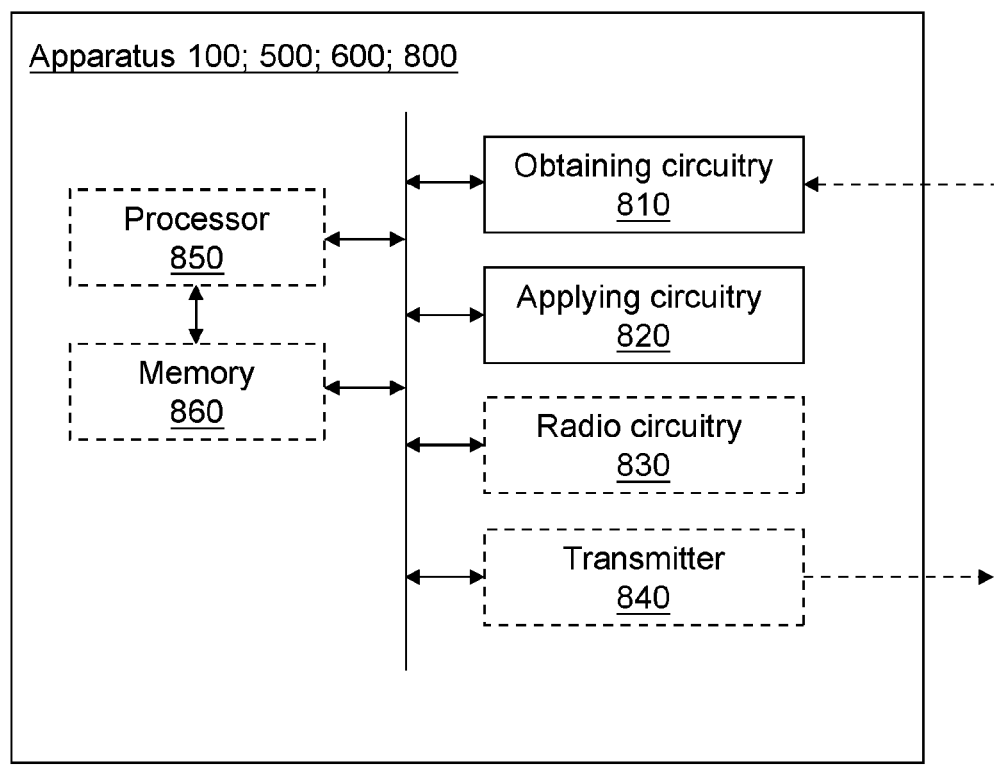
FIG. 8 is a schematic block diagram illustrating an apparatus for application of distortion shaping when using PAR reduction, according to embodiments herein.

To perform the actions 301-304 above for application of distortion shaping when using PAR reduction, an apparatus 800, e.g. corresponding to or comprising any of the apparatuses 100, 500, 600, may comprise an arrangement schematically depicted in FIG. 8. In some embodiments, the apparatus 800 is comprised in the base station 210 of the radio communications system 205, in which the output signal is to be transmitted as a radio signal by the base station 210.

The apparatus 800 comprises an obtaining circuitry 810 configured to obtain the input signal.

The apparatus 800 further comprises an applying circuitry 820 configured to apply, on the input signal, the PAR reduction and the distortion shaping, so that the output signal thereby is formed. As already mentioned, the bandwidth associated with the distortion shaping, e.g. corresponding to frequency contents 403, 406, 411, 413, 414, covers multiple channel bandwidths, e.g. corresponding to frequency contents 401a-c and/or 402 as described above, comprised in the input signal. Said multiple channel bandwidths are associated with one or more RATs.

In some embodiments the apparatus 800 comprises a radio circuitry 830 configured to form the radio signal based on the output signal. Also, in some embodiments, the apparatus 800 further comprises a transmitter 840 configured to transmit the radio signal.

The radio circuitry 830 and the transmitter 840 may fully or partly correspond to the radio transmitter 102.

The embodiments of the apparatus 800 may be fully or partly be implemented through one or more processors, such as a processor 850 depicted in FIG. 8, together with computer program code for performing the functions and actions of embodiments herein. In some embodiments the circuitry discussed above may be fully or partially implemented by the processor 850.

The computer program code mentioned above may also be provided as a computer program product, for instance in the form of a data carrier carrying computer program code for performing the embodiments herein when being loaded into the in the apparatus 800. One such carrier may be in the form of a CD or DVD. It is however feasible with other data carriers such as a memory stick, memory card or hard drive. The computer program code may furthermore be provided as pure program code on a server for download to the apparatus 800.

The computer program code may furthermore be provided in the form of a data file or files on, or available through, a server for download. The file or files may be executable files for direct or indirect download to and execution on the apparatus 800, or may be for intermediate download and compilation to make them executable before download to and for execution in the apparatus 800. The server may be accessible over a computer network, such as the Internet, and may e.g. be a web or ftp server.

The apparatus 800 may further comprise a memory 860 comprising one or more memory units. The memory 860 is arranged to store data, such as configurations and/or applications to perform the method when being executed in the apparatus 800.

Those skilled in the art will also appreciate that the circuitry 810-840 may refer to a combination of analog and digital circuits, and/or one or more processors configured with software and/or firmware (e.g., stored in memory) that, when executed by the one or more processors such as the processor 850, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Embodiments herein e.g. facilitate use of PAR reduction in case of radio communications systems that support multiple RATs and MSR, also in case one of the RATs is GSM, which conventionally typically is considered problematic, as discussed above.

Also, embodiments herein enable improved signal quality for concerned RATs assuming certain dimensioning of power amplifiers or power efficiency. Note that embodiments herein enable better signal quality not only for GSM, but also for the other RAT(s). Additionally, advantages of embodiments herein include enablement of improved and more predictable peak reduction performance, which can be translated into less complex power amplifiers, more power efficient power amplifiers or similar.

Furthermore, embodiments herein enable more efficient use of common resources, e.g. output power, in multi-RAT scenarios. Moreover, embodiments herein allows for more efficient usage of radio resources to ensure that for reasonable dimensioning of power amplifiers, signal quality criteria may be still be fulfilled or even improved.

In the above description of embodiments herein, e.g. LTE, E-UTRA, WCDMA, UTRA, and GSM are mentioned when comparing properties between different technologies. It should however be noted that the invention can in general be applied to any technology, although the embodiments herein may have certain advantages in the context of certain technologies, such as GSM, as discussed in the foregoing.

Generally, embodiments herein are not limited to the above described features and details. Various alternatives, modifications and equivalents may be used. Therefore, the above embodiments should not be taken as limiting the scope of the invention, which is defined by the appending claims.

When using the word "comprise" or "comprising" it shall be interpreted as non-limiting, i.e. meaning "consist at least of".

The invention claimed is:

1. A method in an apparatus for application of distortion shaping when using Peak-to-Average Ratio (PAR) reduction, the method comprising:
    obtaining an input signal; and
    applying, on the input signal, the PAR reduction and the distortion shaping to form an output signal,
    wherein a bandwidth within which the distortion shaping is applied comprises a contiguous frequency block comprising multiple channel bandwidths allocated to and used by a same operator of a radio communications system, and
    wherein the multiple channel bandwidths are one or more Radio Access Technologies (RATs).

2. The method as claimed in claim 1, wherein the bandwidth within which the distortion shaping is applied comprises multiple channel bandwidths associated with different RATs.

3. The method as claimed in claim 1, wherein the bandwidth within which the distortion shaping is applied comprises multiple channel bandwidths associated with a RAT that is based on multiple spaced-apart carrier centered transmission bandwidths.

4. The method as claimed in claim 1, wherein the bandwidth within which the distortion shaping is applied comprises multiple channel bandwidths associated with Global System for Mobile (GSM) Communications.

5. The method as claimed in claim 4, wherein the bandwidth within which the distortion shaping is applied that comprises the multiple channel bandwidths associated with GSM Communications further comprises a portion of the bandwidth that comprises the multiple channel bandwidths not associated with the GSM Communications, and
    wherein the application of the distortion shaping increases distortion in the portion of the bandwidth that covers channel bandwidths not associated with the GSM Communications.

6. The method as claimed in claim 1, wherein the apparatus is comprised in a base station of the radio communications system in which the output signal is transmitted as a radio signal by the base station.

7. The method as claimed in claim 1, wherein the method further comprises:
    forming a radio signal based on the output signal; and
    transmitting the radio signal.

8. The method as claimed in claim 1, wherein the distortion shaping is based on filtering and/or windowing, and
    wherein the bandwidth within which the distortion shaping is applied comprises a filtering and/or windowing bandwidth.

9. The method as claimed in claim 1, further comprising:
    obtaining information comprising the contiguous frequency block comprising the multiple channel bandwidths that is allocated to and used by the same operator.

10. The method of claim 1, wherein the applying the distortion shaping comprises applying a first windowing or a first filtering to a first one of the multiple channel bandwidths and applying a second windowing or a second filtering to a second one of the multiple channel bandwidths, and
    wherein the first windowing is different from the second windowing or the first filtering is different from the second filtering.

11. The method of claim 1, wherein the bandwidth within which the distortion shaping is applied comprises a part of a spectrum that is not protected to a same extent as other parts of the spectrum based on requirements regarding distorting emissions.

12. An apparatus for application of distortion shaping when using Peak-to-Average Ratio (PAR) reduction, wherein the apparatus comprises:
    an obtaining circuitry configured to obtain an input signal; and
    an applying circuitry configured to apply, on the input signal, the PAR reduction and the distortion shaping to form an output signal,
    wherein a bandwidth within which the distortion shaping is applied comprises a contiguous frequency block comprising multiple channel bandwidths allocated to and used by a same operator of a radio communications system, and
    wherein the multiple channel bandwidths are associated with one or more Radio Access Technologies (RATs).

13. The apparatus as claimed in claim 12, wherein the bandwidth within which the distortion shaping is applied comprises multiple channel bandwidths associated with different RATs.

14. The apparatus as claimed in claim 12, wherein the bandwidth within which the distortion shaping is applied comprises multiple channel bandwidths associated with a RAT that is based on multiple spaced-apart carrier centered transmission bandwidths.

15. The apparatus as claimed in claim 12, wherein the bandwidth within which the distortion shaping is applied comprises multiple channel bandwidths associated with Global System for Mobile (GSM) Communications.

16. The apparatus as claimed in claim 12, wherein the apparatus is comprised in a base station of the radio communications system in which the output signal is transmitted as a radio signal by the base station.

17. The apparatus as claimed in claim 12, wherein the distortion shaping is based on filtering and/or windowing, and
    wherein the bandwidth within which the distortion shaping is applied comprises a filtering and/or windowing bandwidth.

18. The apparatus as claimed in claim 12, wherein the apparatus further comprises:
    a radio circuitry configured to form a radio signal based on the output signal; and
    a transmitter configured to transmit the radio signal.

19. A base station comprising the apparatus as claimed in claim 12, wherein the base station is configured to operate in the radio communications system.

20. The apparatus as claimed in claim 12 wherein the bandwidth within which the distortion shaping is applied comprises a part of a spectrum that is not protected to a same extent as other parts of the spectrum based on requirements regarding distorting emissions.

* * * * *